US009042255B2

(12) United States Patent
Mondal et al.

(10) Patent No.: US 9,042,255 B2
(45) Date of Patent: May 26, 2015

(54) METHODS AND APPARATUS FOR DEVICE SCHEDULING

(71) Applicant: Nokia Siemens Networks Oy, Espoo (FI)

(72) Inventors: Bishwarup Mondal, Beavercreek, OH (US); Eugene Visotsky, Buffalo Grove, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 232 days.

(21) Appl. No.: 13/744,907

(22) Filed: Jan. 18, 2013

(65) Prior Publication Data

US 2014/0204770 A1    Jul. 24, 2014

(51) Int. Cl.
*G08C 15/00*     (2006.01)
*H04W 72/12*     (2009.01)
*H04W 24/00*     (2009.01)
*H04B 7/04*      (2006.01)
*H04B 7/06*      (2006.01)

(52) U.S. Cl.
CPC .............. *H04W 72/12* (2013.01); *H04W 24/00* (2013.01); *H04B 7/0417* (2013.01); *H04B 7/0452* (2013.01); *H04B 7/0619* (2013.01)

(58) Field of Classification Search
CPC .................................................... H04B 7/0632
See application file for complete search history.

(56) References Cited

U.S. PATENT DOCUMENTS

| 2011/0176439 | A1* | 7/2011 | Mondal et al. ................. 370/252 |
| 2011/0176629 | A1* | 7/2011 | Bayesteh et al. ............. 375/267 |
| 2012/0314594 | A1  | 12/2012 | Mahadevappa et al. ...... 370/252 |
| 2013/0308488 | A1* | 11/2013 | Tong et al. ..................... 370/252 |

FOREIGN PATENT DOCUMENTS

WO    WO 2012/129803 A1    10/2012

OTHER PUBLICATIONS

Research in Motion et al.; "On Downlink Single Cell MU-MIMO in LTE-A"; R1-094458; 3GPP TSG RAN WG1 Meeting #59; Jeju, Korea; Nov. 9-13, 2009; whole document (8 pages).
(Continued)

*Primary Examiner* — Jason Mattis
*Assistant Examiner* — Kevin Cunningham
(74) *Attorney, Agent, or Firm* — Harrington & Smith

(57) ABSTRACT

Systems and techniques for crosstalk estimation. One or more user devices feed back preceding matrix indicator rank information to one or more base stations, which generated channel state information reference sources, at least one of which includes weightings based on the preceding matrix indicator rank information. One or more user devices estimates channel information based on active preceding matrix indicator information received by the base station from at least one user device. One or more user devices computes channel estimates for a desired transmission channel and one or more other potential transmission channels associated with other user devices and performs crosstalk estimation for the estimated channels. Crosstalk estimation information is fed back to a base station, which performs scheduling based at least in part on the crosstalk estimation from the one or more user devices.

14 Claims, 4 Drawing Sheets

(56) References Cited

OTHER PUBLICATIONS

Liu, J. et al.; "SINR and Inter-STA Interference Indication Feedback in DL MU-MIMO"; IEEE 802.11-11-12-0395; vol. 802.11ac; Mar. 6, 2012; pp. 1-16; IEEE-SA Mentor, Piscataway, NJ USA.

Hitachi Ltd.; "Discussion on simulation results of DL MIMO enhancement in Rel.11"; R1-125080; 3GPP TSG-RAN WG1 #71; New Orleans, USA; Nov. 12-16, 2012; whole document (4 pages).
Samsung; "Downlink MIMO Enhancements for Release-12"; R1-124933; 3GPP TSG RAN WG1 #71; Nov. 12-16, 2012; New Orleans, USA.

* cited by examiner

METHODS AND APPARATUS FOR DEVICE SCHEDULING

TECHNICAL FIELD

The present invention relates generally to telecommunications. More particularly, the invention relates to systems and techniques for computing multiple user multiple input-multiple output scheduling parameters at a scheduler for a cellular network base station.

BACKGROUND

Wireless network operators are constantly seeking to increase the efficiency of their operations, because the design, manufacture, and placement of network infrastructure is costly and because the radiofrequency spectrum allocated for wireless network communication is limited. Operators therefore seek to make the best use they can of their infrastructure and of the available radiofrequency spectrum. One way to increase efficiency is to minimize interference between devices used as part of or supported by a wireless network, and one way to minimize such interference is to schedule transmission for different devices so as to minimize such interference. Scheduling is best conducted if it is based on accurate information relating to factors such as channel quality and possible sources of interference, and accurate estimates of such factors can be used to considerable advantage.

SUMMARY

In one embodiment of the invention, an apparatus comprises at least one processor and memory storing computer program code. The memory storing the computer program code is configured to, with the at least one processor, cause the apparatus to at least control a user device operating in a wireless communications network to monitor at least first and second channel state information reference signal resources. At least one of the channel state information reference signal resources is weighted based on an active preceding matrix indicator rank indicator set. The user device is further controlled to compute channel estimation to estimate a first channel, and determine single user multiple-input multiple-output channel quality information, based on the first channel state information reference signal resource, and to control the user device to perform multiple user multiple-input multiple-output crosstalk estimation to estimate a second channel. The second channel comprises at least one precoded downlink multiple-input multiple-output channel for which transmit weights in the active preceding matrix indicator rank indicator set are used for precoding. The user device is further controlled to compute crosstalk between a desired and a simultaneously scheduled transmission, on the estimated first and second channel, wherein crosstalk estimation is based at least in part on at least one interfering transmit weight used for channel state information reference signal precoding, and to feed back the computed crosstalk to a base station.

In another embodiment of the invention, an apparatus comprises at least one processor and memory storing computer program code. The memory storing the computer program code is configured to, with the at least one processor, cause the apparatus to at least control a base station operating in a wireless communications network to generate at least first and second channel state information reference signal resources. At least one of the channel state information reference signal resources is weighted based on an active precoding matrix indicator rank indicator set. The base station is further controlled o to perform pairwise scheduling of a first and a second user device for transmission. Selection of the first and the second user device is based at least in part on crosstalk estimation fed back by at least one user device. The crosstalk estimation is computed based on an estimated first channel and an estimated second channel. The second channel comprises at least one precoded downlink multiple-input multiple-output channel for which transmit weights in an active preceding matrix indicator rank indicator set are used for preceding, and the transmit weights are transmit weights of a channel state information reference signal resource and based on an active preceding matrix indicator received by the base station from at least one user device.

In another embodiment of the invention, an apparatus comprises at least one processor and memory storing computer program code. The memory storing the computer program code is configured to, with the at least one processor, cause the apparatus to at least control a user device operating in a wireless communications network to perform pairwise crosstalk estimation of a desired transmission channel and a potential transmission channel associated with at least one other user device. Crosstalk estimation is based at least in part on weighting of at least one channel state information reference signal resource, which may be one or more ports of a channel state information reference signal. The user device is further controlled to feed back crosstalk estimation information to a base station.

In another embodiment of the invention, an apparatus comprises at least one processor and memory storing computer program code. The memory storing the computer program code is configured to, with the at least one processor, cause the apparatus to at least control a base station to perform scheduling of user devices based at least in part on pairwise crosstalk estimation of a desired transmission channel and a potential transmission channel associated with at least one other user device. Crosstalk estimation is based at least in part on weighting of at least one channel state information reference signal resource, with the first and the second channel state information reference signal resources based at least in part on weighting of at least one channel state information reference signal resource.

In another embodiment of the invention, a method comprises controlling a user device operating in a wireless communications network to monitor at least first and second channel state information reference signal resources. At least one of the channel state information reference signal resources is weighted based on an active precoding matrix indicator rank indicator set. The method further comprises controlling the user device to compute channel estimation to estimate a first channel, and determine single user multiple-input multiple-output channel quality information, based on the first channel state information reference signal resource, and to perform multiple user multiple-input multiple-output crosstalk estimation to estimate a second channel. The second channel comprises at least one precoded downlink multiple-input multiple-output channel for which transmit weights in the active precoding matrix indicator rank indicator set are used for precoding. The method further comprises controlling the user device to compute crosstalk between a desired and a simultaneously scheduled transmission, on the estimated first and second channel, wherein crosstalk estimation is based at least in part on at least one interfering transmit weight used for channel state information reference signal precoding, and to feed back the computed crosstalk to a base station.

In another embodiment of the invention, a method controlling a base station operating in a wireless communications network to generate at least first and second channel state information reference signal resources. At least one of the channel state information reference signal resources is weighted based on an active preceding matrix indicator rank indicator set. The method further comprises controlling the base station to perform pairwise scheduling of a first and a second user device for transmission. Selection of the first and the second user device is based at least in part on crosstalk estimation fed back by at least one user device. The crosstalk estimation is computed based on an estimated first channel and an estimated second channel. The second channel comprises at least one preceded downlink multiple-input multiple-output channel for which transmit weights in an active precoding matrix indicator rank indicator set are used for preceding, and the transmit weights are transmit weights of a channel state information reference signal resource and based on an active precoding matrix indicator received by the base station from at least one user device.

In another embodiment of the invention, a method comprises controlling a user device operating in a wireless communications network to perform pairwise crosstalk estimation of a desired transmission channel and a potential transmission channel associated with at least one other user device. Crosstalk estimation is based at least in part on weighting of at least one channel state information reference signal resource. The method further comprises controlling the user device to feed back crosstalk estimation information to a base station.

In another embodiment of the invention, a method comprises controlling a base station to operating in a wireless communications network to generate at least one channel state information reference signal resource based at least in part on precoding matrix indicator rank indicator information received from at least one user device and to perform scheduling of user devices based at least in part on pairwise crosstalk estimation of a desired transmission channel and a potential transmission channel associated with at least one other user device. Crosstalk estimation is based at least in part on weighting of at least one channel state information reference signal resource, with the first and the second channel state information reference signal resources based at least in part on weighting of at least one channel state information reference signal resource.

DETAILED DESCRIPTION

Embodiments of the present invention recognize that multiple user multi-input multi-output (MU-MIMO) communication is widely used in systems such as third generation preferred partnership long term evolution (3GPP LTE, or LTE) systems, and that base stations, such as eNodeBs (eNBs) used crosstalk estimates to make decisions at an eNB scheduler. Such decisions include multiple user pairing and link adaptation decisions. Correct pairing decisions and accurate link adaptation are particularly important in insuring good MU-MIMO performance in LTE fixed division duplexing (FDD) systems. In general, MU-MIMO scheduling is implementation-specific. However, embodiments of the present invention recognize that codebook-based MU-MIMO generally does not yield performance significantly superior to that of codebook-based SU-MIMO approaches. Inability of the eNB scheduler to accurately estimate the crosstalk interference level between simultaneously multiplexed UEs is a major factor degrading MU-MIMO performance.

In one or more embodiments, the invention provides for increased precision for crosstalk estimates at the eNB for MU-MIMO scheduling based on codebook feedback. Such increased precision improves the performance of the MU-MIMO scheduler, reducing the likelihood that scheduling and link adaptation decisions made by the scheduler will be erroneous. One or more embodiments of the invention enable explicit pair-wise crosstalk feedback from the UEs to the eNB, while maintaining reasonable overhead. For example, in one or more embodiments of the invention, UEs may perform feedback of pair-wise crosstalk estimates to a serving eNB, with a crosstalk estimate being computed for each pairing of the desired transmit weight with one of the transmit weights in the active precoding matrix indicator rank indicator (PMI-RI) set. A dedicated channel state information reference signal resource may be used to enable channel estimation by the UEs of precoded interfering channels. An eNB may configure different channel state information processes. One may be an unprecoded channel state information reference signal and one or more others may be used to convey precoded channel state information representing multiple user multiple-input multiple-output crosstalk information.

Figure 1:
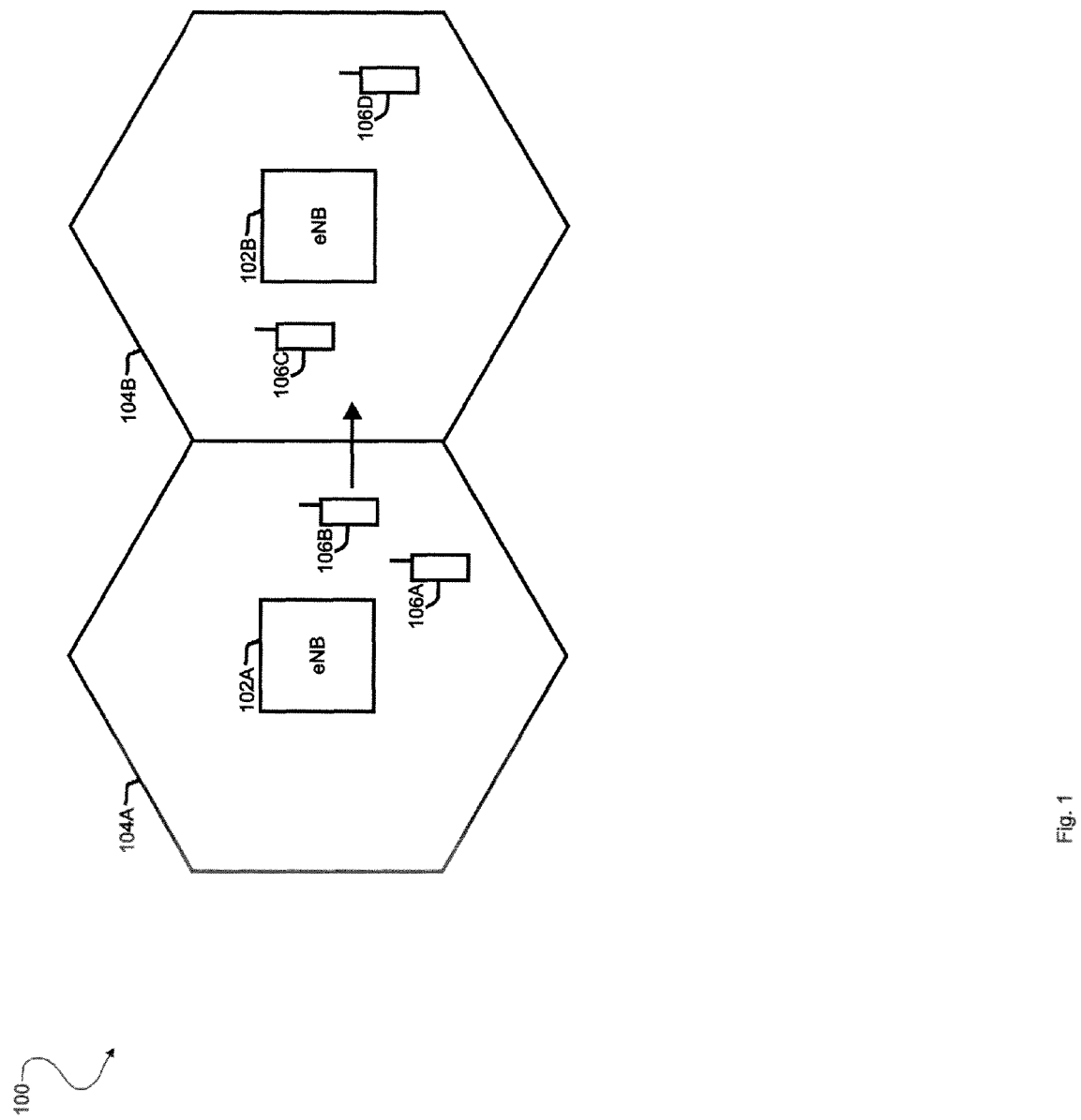
FIG. 1 illustrates a network according to an embodiment of the present invention.

FIG. 1 illustrates a wireless network 100 comprising eNBs 102A and 102B, defining cells 104A and 104B, respectively. The network serves user devices 106A, 106B, 106C, and 106D, with each user device being served by one or more of the eNBs 102A and 102B. One or more embodiments of the present invention provide for a downlink (DL) channel state information reference signal (CSI-RS) precoding and uplink (UL) feedback scheme providing for relatively precise MU-MIMO crosstalk estimates at a scheduler used by a base station, such as an eNB scheduler used at, for example, one or both of the eNBs 102A and 102B. In one or more embodiments of the invention, the network 100 is a fixed division duplex (FDD) LTE system in which multiuser scheduling is performed based on codebook, or Precoder Matrix Indicator (PMI), feedback from the UEs. In one or more exemplary embodiments of the invention, all UEs in a cell maintain DE MIMO channel estimates and periodically send their PMI and Rank Indicator (RI) feedback to the serving eNB. For convenience, the set of PMI and RI pairs fed back by the UEs may be referred to as the active PMI-RI set.

In one or more embodiments of the invention, CSI-RS pilots may be preceded with the transmit weights corresponding to the active PMI-RI set. More precisely. UEs are assigned to monitor two CSI-RS resources. In the first CSI-RS resource, UEs perform channel estimation of the desired channel and determine single user MIMO (SU-MIMO) channel quality information (CQI). The second CSI-RS resource may be used by the UEs to perform an MU-MIMO crosstalk estimation procedure. Each UE may be dynamically or statically configured to monitor a specified subset of the CSI-RS ports in the second CSI-RS resource. By performing channel estimation on these ports, a UE can identify the precoded DL MIMO channels for which the transmit weights in the active PMI-RI set are used for precoding. In addition, the UE may compute its desired precoded DL MIMO channel based on its most recently fed back PMI information and the un-precoded DL MIMO channel estimate estimated in the first CSI-RS resource.

Based on the estimated channels in both CSI-RS resources, the UE computes the crosstalk between its desired and simultaneously scheduled transmissions, using the interfering transmit weights used for the CSI-RS precoding. All active UEs periodically feed back their crosstalk estimates to the serving eNB, with a one-to-one correspondence between the PMI-RI pairs used for the CSI-RS precoding on the DL and the crosstalk estimates fed back on the UL. The crosstalk estimates can be fed back, for example, as quantized crosstalk-to-desired power ratios or in the format of MU-MIMO CQIs. An MU-MIMO CQI may suitably be defined for presentation in the same format as SU-MIMO CQI, but, in addition to information similar to that of an SU-MIMO CQI, may also include MU-MIMO interference information and may, alternatively or in addition, include MU-MIMO power allocation information. Numerous alternative numerical formats may be used. Numerous alternative choices for computing crosstalk estimates are available; for example, the estimates may be wideband or may be frequency-selective.

Such a mechanism provides for crosstalk estimates and MU-MIMO CQIs provided to the eNB that are pairwise as between each UE's desired transmission and other potential transmissions multiplexed to other UEs. Such crosstalk estimates can be readily used by the scheduler for pairing decisions. Once the pairing decision has been made, the crosstalk estimates or pair-wise MU-MIMO CQIs can be further used by the scheduler to derive the final MU-MIMO CQIs to be used for rate matching. It will be noted, however, that without explicit crosstalk or MU-MIMO CQI feedback from the UEs, these crosstalk estimates cannot be easily derived at the eNB because the scheduler typically has only a very coarse view of the DL channels based on UE PMI feedback. In addition, the scheduler has no knowledge of the receive weights being formed at the UEs. Such an approach may also be employed with multi-rank MU-MIMO and can support an arbitrary number of multiplexed UEs.

Embodiments of the invention may use various strategies to reduce overhead and UE computational burden. In one exemplary embodiment of the invention, an eNB may pair-down the number of CSI-RS ports to be tracked by UEs by precoding only ports with PMI-RI pairs fed back by those UEs with higher scheduling priority. One or more alternative exemplary embodiments take advantage of the knowledge that not all PMI indices are fed back by the UEs with equal probability. The set of the most probable PMI indices may depend on the eNB antenna geometry, as well as other factors associated with network deployment that may be known at the scheduler in advance. Thus, the active PMI-RI set used for CSI-RS precoding may be statically configured at the eNB to include only a subset of the most used PMI indices. Any of a number of procedures may be used at the eNB for determining the active PMI-RI set, with the specific procedure to be used being a matter of design choice.

Figure 2:
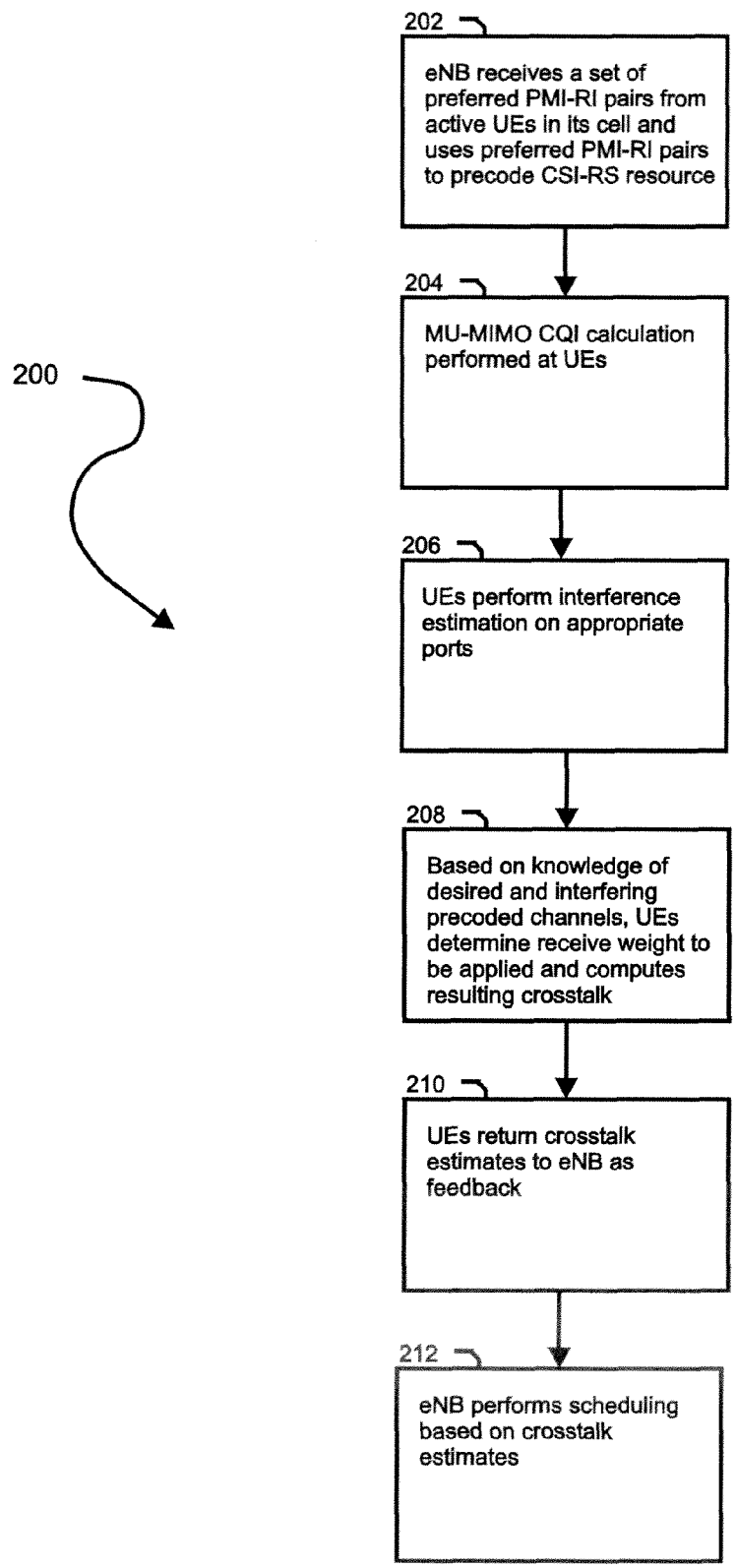
FIGS. 2 and 3 illustrate processes according to embodiments of the present invention.
Figure 3:
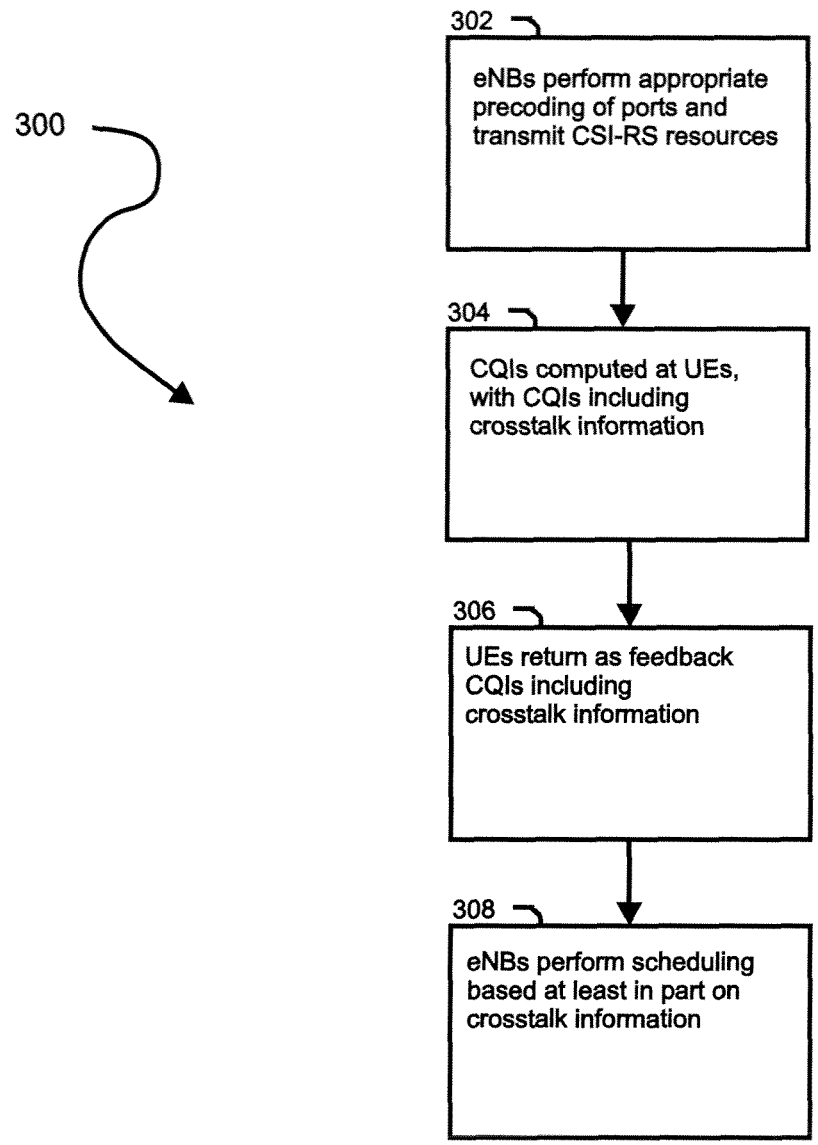

FIGS. 2 and 3 present processes according to different exemplary embodiments of the invention. FIG. 2 presents a process 200 addressing an exemplary set of procedures carried out in a single cell by an eNB whose service range defines the cell and by UEs served by the eNB. The eNB may be, for example, the eNB 102A defining the cell 104A, and the UEs may be the UEs 106A and 106B.

At step 202, an eNB receives a set of preferred PMI-RI pairs from the active UEs in its cell. As noted above, the devices may be the eNB 102A defining the cell 104A, and the UEs 106A and 106B. The set of active PMI-RI pairs is used for precoding a CSI-RS resource. For simplicity, in the present example, the eNB 102A serves only the UEs 106A and 106B, which are the only active UEs being served, but it will be recognized that an eNB may serve many UEs and that the principles discussed here may be used with an eNB serving any number of UEs. In addition, the exemplary UEs 106A and 106B discussed here prefer rank-1 transmissions, but embodiments of the invention may be used with transmissions of arbitrary rank. Weightings are applied to each PMI, with the $PMI_1$ from $UE_1$ (which may be the UE 106A) corresponding to transmit weight $w_1$ and, similarly, $PMI_2$ (which may be from $UE_2$ or UE 106B) correspond to $w_2$. The eNB precedes CSI-RS ports $p_1$ and $p_2$ with transmit weights $w_1$ and $w_2$, respectively.

At step 204, MU-MIMO CQI calculation is performed at the UEs. For simplicity, $UE_1$ is discussed in detail and it will be understood that similar operations may be carried out with respect to $UE_2$.

At step 206, $UE_1$ is signaled to perform interference estimation on an appropriate port, in this case port $p_2$. Based on this estimate, $UE_1$ estimates the precoded interference signal $H_1w_2$. In another CSI-RS resource, $UE_1$ estimates $H_1$ and computes the precoded desired signal as $H_1w_2$. As noted above, $UE_2$ is similarly signaled and makes similar computations.

At step 208, based on the knowledge of the desired and interfering precoded channels $H_1w_2$ and $H_1w_2$, the $UE_1$ determines a receive weight to be applied and computes the resulting crosstalk between the two channels. Similar computations may be performed by the $UE_2$. It will be noted that the exact method to compute the receiver and crosstalk may be chosen based on a need for adaptation to a particular implementation, but several methods are well known in the prior art.

At step 210, the $UE_1$ returns the crosstalk estimate to the eNB as feedback, for example, by quantizing and feeding back the resulting crosstalk estimate, or by using the crosstalk estimate to compute the MU-MIMO CQI and including the MU-MIMO that is so computed in its feedback to the eNB.

At step 212, the eNB performs scheduling based on the crosstalk estimate.

DL signaling needed to accommodate the precoded CSI-RS resource may be performed, for example, by use of a VCID, Pc, resource-config and subframe-config. In addition, UE specific signaling may be used to signal a set of ports to a UE for monitoring in order to determine interference.

The approach discussed above is particularly suitable for MU-MIMO transmissions in which the eNB has freedom to estimate MU-MIMO interference by choosing the precoding weights for CSI-RS appropriately. It will be understood that while a UE can be semi-statically signaled to monitor one or more precoded CSI-RS ports, the eNB has the flexibility to change the precoding weights on the CSI-RS to reflect MU-MIMO interference appropriately without having to signal anything to the UE.

One or more additional embodiments of the invention may be used in conjunction with Interference Measurement Resources (IMRs). Specifically, IMR may be used to measure other-cell interference at the UE, while a precoded CSI-RS resource may be used for estimating intra-cell MU-MIMO interference at the UE. Using both sets of interference measurements, a UE can form an IRC receiver for determining MU-MIMO cross-talk or MU CQI in accordance with this invention.

One or more embodiments of the invention can be applied to facilitate link performance with IRC receivers. The total interference measured at a UE may be split into two components—one component is observed on the Interference Measurement Resources (IMRs) and the other component is measured on the precoded CSI-RS resource. The interference component measured on the precoded CSI-RS resource (a dominant interferer) may be estimated with high quality, enabling better suppression by an IRC receiver—this may be applicable more generally for suppressing dominant interference from other cells. FIG. 3 illustrates a process 300 according to an embodiment of the present invention, using an example of the approach described above.

FIG. 3 illustrates a process 300 according to another embodiment of the invention. The process 300 embodies an approach used in conjunction with interference measurement resources (IMRs). IMR is used to measure other-cell interference at the UE, while a precoded CSI-RS resource is used for estimating intra-cell MU-MIMO interference at the UE. According to one or more embodiments of the invention, the use of both sets of interference measurements allows a UE to form an IRC receiver for determining MU-MIMO crosstalk or MU CQI.

The process 300 addresses UEs served by different eNBs. In the present example, then, $UE_1$ may be the UE 106A, served by the $eNB_1$, which may be the eNB 102A, and $UE_2$ may be the UE 106C, served by the $eNB_2$, which may be the eNB 102B. In the present example, no other active UEs are served by $eNB_1$ or $eNB_2$ so that in the present exemplary case the UEs 106B and 106D may be deactivated or absent.

In the present example, $UE_1$ and $UE_2$ prefer rank-1 transmissions. $PMI_1$ fed back by from $UE_1$ may correspond to transmit weight $w_1$ and, similarly, $PMI_2$ from $UE_2$ may correspond to transmit weight $w_2$. At step 302, then, $eNB_2$ precedes CSI-RS-2 port $p_2$ with transmit weight $w_2$. $eNB_1$ transmits CSI-RS-1 without precoding. In addition, the network configures IMR-1 such that neither $eNB_1$ nor $eNB_2$ transmits on IMR-1. However, other cells, if present, are allowed to transmit on IMR-1.

At step 304, CQI calculation is performed at $UE_1$ and $UE_2$. $UE_1$ is configured with CSI-RS-1, IMR-1. and CSI-RS-2. $UE_1$ measures its desired channel on CSI-RS-1. $UE_1$ is also signaled to perform interference estimation on port $p_2$ of CSI-RS-2. $UE_1$ can thus compute a CQI considering the desired channel part from CSI-RS-1 and the total interference observed from CSI-RS-2 port $p_2$ plus IMR-1. By so deriving a channel estimate from port $p_2$ of CSI-RS-2, the UEs can accurately compute a post IRC receiver CQI. CQI is similarly carried out at $UE_2$.

At step 306, $UE_1$ and $UE_2$ feed back CQI to $eNB_1$ and the $eNB_2$. At step 308. the eNBs perform scheduling based at least in part on crosstalk information, which may be included in the CQI fed back to the eNBs.

Figure 4:
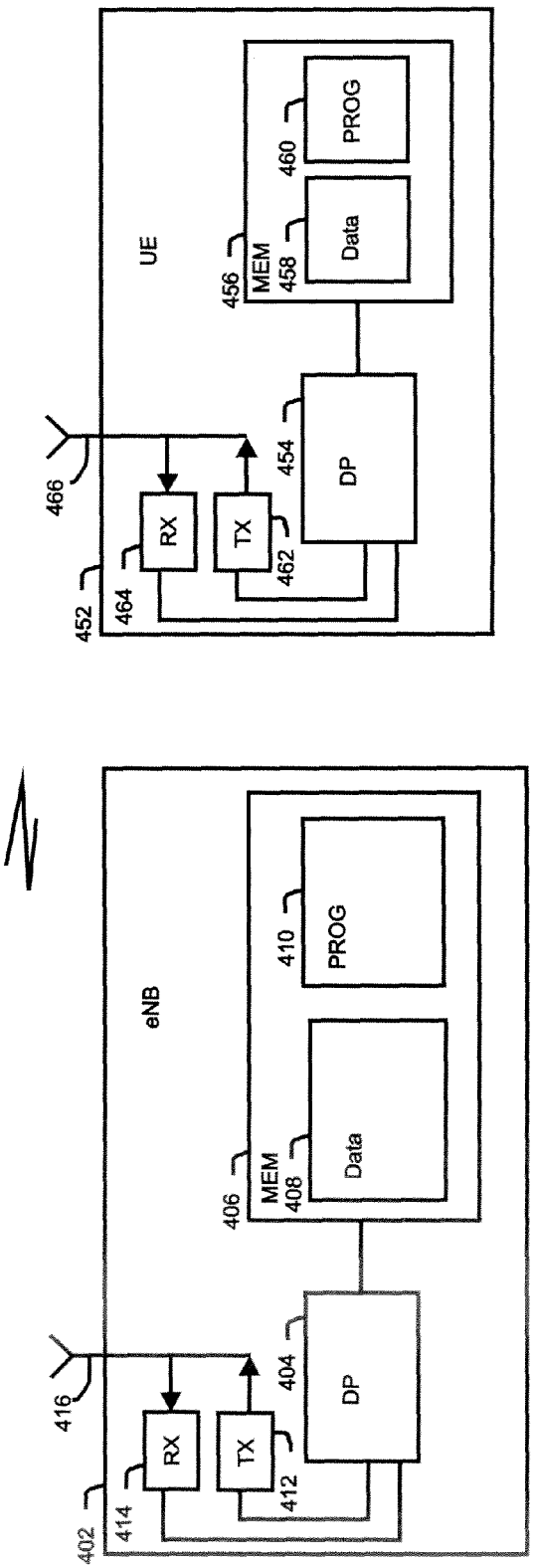
FIG. 4 illustrates elements according to embodiments of the present invention.

Reference is now made to FIG. 4 for illustrating a simplified block diagram of a base station, such an eNB 402 and a user device, such as a UE 452, suitable for use in practicing the exemplary embodiments of this invention. In FIG. 4 an apparatus, such as the eNB 402, is adapted for communication with other apparatuses having wireless communication capability, such as the UE 452.

The eNB 402 includes processing means such as at least one data processor (DP) 404, storing means such as at least one computer-readable memory (MEM) 406 storing data 408 and at least one computer program (PROG) 410 or other set of executable instructions, communicating means such as a transmitter TX 412 and a receiver RX 414 for bidirectional wireless communications with the UE 402 via one or more antennas 416.

The UE 452 includes processing means such as at least one data processor (DP) 454, storing means such as at least one computer-readable memory (MEM) 456 storing data 458 and at least one computer program (PROG) 460 or other set of executable instructions, communicating means such as a transmitter TX 462 and a receiver RX 464 for bidirectional wireless communications with the eNB 400 via one or more antennas 466.

At least one of the PROGs 410 in the eNB 402 is assumed to include a set of program instructions that, when executed by the associated DP 404, enable the device to operate in accordance with the exemplary embodiments of this invention, as detailed above. In these regards the exemplary embodiments of this invention may be implemented at least in part by computer software stored on the MEM 406, which is executable by the DP 404 of the eNB 402, or by hardware, or by a combination of tangibly stored software and hardware (and tangibly stored firmware). Similarly, at least one of the PROGs 460 in the UE 452 is assumed to include a set of program instructions that, when executed by the associated DP 454, enable the device to operate in accordance with the exemplary embodiments of this invention, as detailed above. In these regards the exemplary embodiments of this invention may be implemented at least in part by computer software stored on the MEM 456, which is executable by the DP 454 of the UE 452, or by hardware, or by a combination of tangibly stored software and hardware (and tangibly stored firmware). Electronic devices implementing these aspects of the invention need not be the entire devices as depicted at FIG. 1 or FIG. 4 or may be one or more components of same such as the above described tangibly stored software, hardware, firmware and DP, or a system on a chip SOC or an application specific integrated circuit ASIC.

In general, the various embodiments of the UE 452 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 406, and 456 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 404 and 454 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof. For example, the above description has been directed primarily to 3GPP Long term Evolution (LTE) networks, but it will be recognized that one or more embodiments of the invention may also be adapted to universal mobile telecommunications service (UMTS).

We claim:

1. An apparatus comprising:
   at least one processor;
   memory storing computer program code;

wherein the memory storing the computer program code is configured to, with the at least one processor, cause the apparatus to at least:

control a user device operating in a wireless communications network to monitor at least first and second channel state information reference signal resources, wherein at least one of the channel state information reference signal resources is weighted by a transmit weight chosen from an active precoding matrix indicator rank indicator set;

control the user device to compute channel estimation to estimate a first channel, and determine single user multiple-input multiple-output channel quality information, based on the first channel state information reference signal resource;

control the user device to perform channel estimation to estimate a second channel, wherein the second channel comprises at least one precoded downlink multiple-input multiple-output channel for which transmit weights chosen from the active precoding matrix indicator rank indicator set are used for precoding;

control the user device to compute pairwise crosstalk between a desired and a simultaneously scheduled transmission, on the estimated first and second channel, wherein crosstalk estimation is based at least in part on at least one interfering transmit weight used for channel state information reference signal precoding, wherein the computed pairwise crosstalk has a one-to-one correspondence between the precoding matrix indicator rank indicator pairs used for the channel state information reference signal precoding on the downlink and the crosstalk estimates fed back on the uplink; and control the user device to feed back the computed pairwise crosstalk to a base station.

2. The apparatus of claim 1, wherein estimation of the at least the second channel is based on a specified subset of channel state information reference signal ports in the second channel state information reference signal resource.

3. The apparatus of claim 1, wherein the active preco ding matrix indicator rank indicator set used for precoding is a collection of transmit weights constructed by a base station based in part on the precoding matrix indicators and rank indicators fed back by one or more user devices that are currently active in the downlink.

4. The apparatus of claim 1, wherein a desired transmission is a transmission on a desired downlink multiple-input multiple-output channel computed based at least in part on the user device's most recently fed back precoding matrix indicator index.

5. The apparatus of claim 1, wherein the computed crosstalk is fed back in the form of a quantized crosstalk to desired power ratio.

6. The apparatus of claim 1, wherein the computed crosstalk is fed back in the form of channel quality information.

7. An apparatus comprising:
at least one processor;
memory storing computer program code;
wherein the memory storing the computer program code is configured to, with the at least one processor, cause the apparatus to at least:
control a base station operating in a wireless communications network to generate at least first and second channel state information reference signal resources, wherein at least one of the channel state information reference signal resources is weighted by a transmit weight chosen from an active precoding matrix indicator rank indicator set; and control the base station to perform pairwise scheduling of a first and a second user device for transmission, wherein selection of the first and the second user device is based at least in part on a pairwise crosstalk estimation fed back by at least one user device, wherein the pairwise crosstalk estimation is computed based on an estimated first channel and an estimated a second channel, wherein the second channel comprises at least one precoded downlink multiple-input multiple-output channel for which transmit weights chosen from an active precoding matrix indicator rank indicator set are used for precoding, wherein the computed pairwise crosstalk has a one-to-one correspondence between the precoding matrix indicator rank indicator pairs used for the channel state information reference signal precoding on the downlink and the crosstalk estimates fed back on the uplink.

8. A method comprising:
controlling a user device operating in a wireless communications network to monitor at least first and second channel state information reference signal resources, wherein at least one of the channel state information reference signal resources is weighted based on an active precoding matrix indicator rank indicator set;

controlling the user device to compute channel estimation to estimate a first channel, and determine single user multiple-input multiple-output channel quality information, based on the first channel state information reference signal resource;

controlling the user device to perform crosstalk estimation to estimate a second channel, wherein the second channel comprises at least one precoded downlink multiple-input multiple-output channel for which transmit weights in the active precoding matrix indicator rank indicator set are used for precoding;

controlling the user device to compute pairwise crosstalk between a desired and a simultaneously scheduled transmission, at least on the estimated first and at least the second channel, wherein crosstalk estimation is based at least in part on at least one interfering transmit weight used for channel state information reference signal precoding, wherein the computed pairwise crosstalk has a one-to-one correspondence between the precoding matrix indicator rank indicator pairs used for the channel state information reference signal precoding on the downlink and the crosstalk estimates fed back on the uplink; and controlling the user device to feed back the computed crosstalk to a base station.

9. The method of claim 8, wherein estimation of the at least the second channel is based on a specified subset of channel state information reference signal ports in the second channel state information reference signal resource.

10. The method of claim 8, wherein the active precoding matrix indicator rank indicator set used for precoding is a collection of transmit weights constructed by a base station based in part on the precoding matrix indicators and rank indicators fed back by one or more user devices that are currently active in the downlink.

11. The method of claim 8, wherein a desired transmission is a transmission on a desired precoded downlink multiple-input multiple-output channel computed based on the user device's most recently fed back precoding matrix indicator index.

12. The method of claim 8, wherein the computed crosstalk is fed back in the form of a quantized crosstalk to desired power ratio.

13. The method of claim 8, wherein the computed crosstalk is fed back as part of channel quality information.

14. A method comprising:
controlling a base station operating in a wireless communications network to generate at least first and second channel state information reference signal resources, wherein at least one of the channel state information reference signal resources is weighted based on an active precoding matrix index rank indicator set; and
controlling the base station to perform pairwise scheduling of a first and a second user device for transmission, wherein selection of the first and the second user device is based at least in part on crosstalk estimation fed back by at least one user device, wherein the crosstalk estimation is computed based on at least an estimated first channel and an estimated a second channel, wherein the at least the second channel comprises at least one precoded downlink multiple-input multiple-output channel for which transmit weights in an active precoding matrix index rank indicator set are used for precoding, and wherein the transmit weights are transmit weights of a channel state information reference signal resource and based on an active precoding matrix indicator received by the base station from at least one user device, wherein the computed pairwise crosstalk has a one-to-one correspondence between the precoding matrix indicator rank indicator pairs used for the channel state information reference signal precoding on the downlink and the crosstalk estimates fed back on the uplink.

* * * * *